UNITED STATES PATENT OFFICE.

CHARLES A. ERNST, OF SCHENECTADY, NEW YORK, ASSIGNOR TO GENERAL ELECTRIC COMPANY, A CORPORATION OF NEW YORK.

ELECTRODE.

1,019,443.

Specification of Letters Patent. Patented Mar. 5, 1912.

No Drawing. Application filed April 6, 1904. Serial No. 201,829.

*To all whom it may concern:*

Be it known that I, CHARLES A. ERNST, a citizen of the United States, residing at Schenectady, in the county of Schenectady and State of New York, have invented certain new and useful Improvements in Electrodes, of which the following is a specification.

I have discovered that excellent results can be obtained by the use of the mineral franklinite as an ingredient in the composition of electrodes for arc lighting.

Franklinite gives a steady flaming or luminous arc of good color and may be employed as the sole ingredient in electrodes. I prefer however to mix with the franklinite more or less of some material such as titanium oxid which gives a luminous arc of great brilliancy. In particular I have obtained excellent results with an electrode consisting of an iron tube or sheath filled with a powdered mixture containing about 70 parts of franklinite and 30 parts of titanium oxid. The franklinite which I have frequently used contains about 43 parts of iron, 17 parts of zinc and 12 parts of manganese, though the exact composition of the franklinite does not seem to be important since more or less of one or the other of these constituents does not materially affect the utility of the electrode; nor is it of any consequence whether or not these constituents found in franklinite are chemically combined with other elements or with each other, since, in the electric arc such chemical combinations become dissociated. The electrode thus constructed is a good conductor of electricity at ordinary temperatures and gives a steady arc of great luminosity and of a good white color.

The proportion of franklinite and titanium oxid may be varied between quite wide limits without materially affecting the character of the electrode. Instead of inserting the franklinite and titanium oxid in an iron sheath, I may moisten the powdered mixture with a suitable binder to render it plastic, and mold electrodes therefrom. In this case the electrodes are preferably heated somewhat after they are molded. In some cases I prefer to employ with the franklinite some material such as a chromium compound which will lessen the consumption of the electrode by the arc. Such material may be called a restraining material, or a restrainer.

What I claim as new and desire to secure by Letters Patent of the United States, is,

1. An arc light electrode material consisting of a powdered mixture of franklinite, titanium oxid and a restrainer.

2. An arc light electrode material consisting of a powder containing a preponderating amount of a mixture of franklinite and titanium oxid.

3. An arc light electrode material consisting of a powder containing a preponderating amount of franklinite.

4. An arc light electrode mixture containing seventy parts of franklinite and thirty parts of titanium oxid.

5. A composite arc-light electrode containing franklinite as a constituent.

6. A composite arc-light electrode containing franklinite and titanium oxid as constituents.

7. A composite arc-light electrode containing franklinite, titanium oxid and a restrainer as constituents.

8. A composite arc-light electrode containing iron, zinc and manganese as elementary constituents.

9. A composite arc-light electrode containing iron, zinc, manganese and titanium as elementary constituents.

10. A composite arc-light electrode containing iron, zinc, manganese, titanium and a restrainer as elementary constituents.

In witness whereof, I have hereunto set my hand this 5th day of April, 1904.

CHARLES A. ERNST.

Witnesses:
BENJAMIN B. HULL,
HELEN ORFORD.